INVENTORS
WALLACE K. GASSEI
JAMES R. NEIDEL
BY
Badell & Burgess
ATTORNEYS

United States Patent Office 3,548,252
Patented Dec. 15, 1970

3,548,252
DELAYED HEADLAMP SYSTEM WITH
DOOR CONTROL
Wallace K. Gassei, 890 Bellarmine, Florissant, Mo.
63031, and James R. Neidel, 514 Ambergate Drive,
Webster Groves, Mo. 63119
Filed May 14, 1969, Ser. No. 824,594
Int. Cl. B60q 1/04, 1/08
U.S. Cl. 315—82                                    9 Claims

ABSTRACT OF THE DISCLOSURE

An automatic control system for automobile headlights comprising a source of electrical power, a first relay comprising a coil and a normally closed switch, switch means between said source and said coil for selectively energizing the latter to open said first relay switch, a normally open switch closable responsive to opening of the automobile door, a second relay comprising a coil and two switches, an electrical circuit including said power source, said first relay switch which is normally closed, and said second relay coil and said normally opened door responsive switch, a headlight circuit including said power source, a headlight switch, the headlights, and one of said second relay switches whereby upon opening said switch means and thereby closing said first relay switch, and thereafter opening the door to close said door switch and energize said second relay, said second relay first switch is opened to deenergize the headlights. For manually turning the lights back on, a manual reset switch is provided in a shunt circuit including the second pole of the other switch of the second relay, which is closed when the second relay is energized.

BACKGROUND OF THE INVENTION

Field of the invention.—The invention relates to automobile headlight control systems whereby turning off the ignition switch and vacating the automobile automatically turns the headlights off to prevent discharge of the battery.

The prior arts.—The prior art discloses means for audibly or visually warning the driver of an automobile that his headlights are on when he shuts off the ignition switch and vacates the car, but does not disclose means for automatically turning off the headlights under such conditions.

DESCRIPTION OF THE PREFERRED EMBODIMENT

Figure 1:
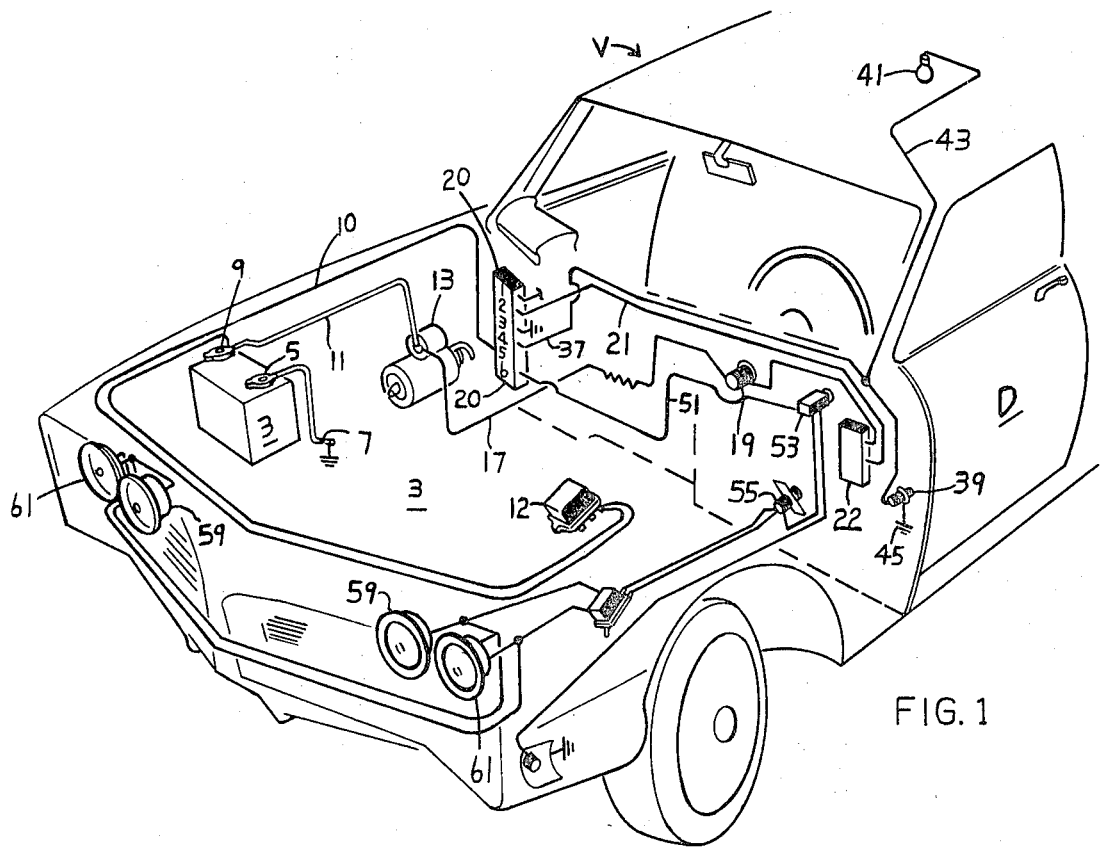
FIG. 1 is a partial view of an automobile showing its headlight circuitry and related electrical circuits.

In the drawings the letter V refers generally to an automobile having a door D adjacent the driver's station at the left side of the front seat. In the engine compartment 1 is a power source comprising a battery 3, the positive post 5 of which is grounded at 7. The negative post 9 of battery 3 is connected by line 11 to starter solenoid 13, which in turn is connected by line 17 to ignition switch 19 and by line 21 through fuse box 22 to terminal $T_2$ of the control unit generally indicated at 20, mounted on the automobile fire wall and having terminals $T_1$ to $T_6$. The control unit circuitry is shown schematically in FIG. 2.

Terminal $T_3$ connects to a chassis or common ground.

Terminal $T_5$ is connected to the negative post of the battery by a line 10 through voltage regulator 12.

Figure 2:
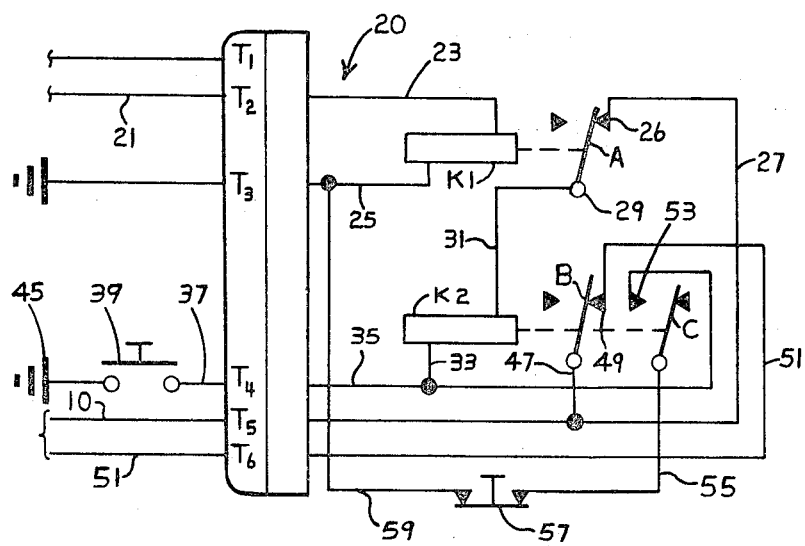
FIG. 2 is a schematic diagram of circuitry embodying the invention.

As best seen in FIG. 2, terminal $T_2$ is connected by line 23 to relay $K_1$ which is grounded through line 25 and terminal $T_3$ so that, when ignition switch 19 is closed, relay $K_1$ will be energized. Relay $K_1$ includes a normally closed switch A, one contact 26 of which is connected by line 27 to terminal $T_5$, and the other terminal 29 of which is connected by a line 31 to a second relay $K_2$, which is connected to terminal $T_4$ by lines 33 and 35. Terminal $T_4$ is connected by line 37 to normally open door switch 39 mounted on the left front door post of the automobile. Door switch 39 is arranged to close when the door is open so as to energize dome light 41 to which it is connected by line 43. Door switch 39 is grounded at 45 so that, when the ignition switch is turned off and relay $K_1$ accordingly deenergized, and switch A consequently closed, as long as the car door is closed, so that door switch 39 is open, relay $K_2$ will not be energized, but upon opening of door D and consequent closure of door switch 39, relay $K_2$ will be energized.

Relay $K_2$ controls a pair of switches B and C. Switch B is connected by line 47 to line 27, which is connected to the 12-volt DC power source through terminal $T_5$, and contact 49 of switch B is connected by line 51 to the headlight circuit including headlight switch 53, dimmer switch 55, headlights 59 and 61, so that when door D is first opened after the ignition switch is turned off, relay $K_2$ will be energized by the circuit including terminal $T_5$, line 27, relay switch A and line 31, with return through terminal $T_4$, line 37 and door switch 39. This will open switch B, breaking the headlight circuit even if headlight switch 53 is closed.

Conversely, upon turning on ignition switch 19 relay $K_1$ will energized, opening switch A, and deenergizing relay $K_2$ to open switch B, thus permitting the headlights to be reenergized.

From the foregoing it will be evident that if door D is opened after the ignition switch has been turned off, the headlight circuit will be deenergized even if headlight switch 53 is left on.

To keep relay $K_2$ energized after the car door has been closed and switch 39 thereby opened, relay $K_2$ includes a second switch C which, upon initial energization of relay $K_2$ by closure of door switch 39, closes through contact 59, which is connected to line 35. The other terminal of switch C is connected by line 55 to normally closed reset switch 57, which is connected by line 59 to grounded terminal $T_3$. Hence, after the door is closed, relay $K_2$ will be grounded through line 33, line 35, switch C, line 53, reset switch 57, line 59 and terminal $T_3$, to keep switch B, which controls the headlight circuit, open.

If it is desired to turn the lights back on while the ignition switch is turned off, reset switch 57 may be opened, to break the circuit through relay $K_2$. This will cause switch B to close, completing the headlight circuit through lines 51 and terminal $T_6$.

Operation of the system is as follows: When the driver turns off the ignition switch, relay $K_1$ is deenergized, permitting switch A to close and complete a partial circuit from terminal $T_4$ through lines 27 and 31 to relay $K_2$. When the driver opens door D, door switch 39 closes, completing the circuit from relay $K_2$ through lines 33 and 35 to terminal $T_4$ and thence through line 37 and door switch 39 to ground. Relay $K_2$ then opens switch B, breaking the headlight circuit, and closes switch C, completing another shunt circuit from relay $K_2$ to ground through line 55, reset switch 57, line 59 and terminal $T_3$ so that when the door is closed, causing door switch 39 to open, relay $K_2$ remains energized and switch B, controlling the headlight circuit, remains open, keeping the headlights turned off even though the headlight switch 53 remains on. By manually opening reset switch 57, however, relay $K_2$ will be deenergized, permitting switch B to close and thus energize the headlight switch. When the ignition switch is turned on to start the car, relay $K_1$ will be energized to open switch A, thus breaking the circuit through relay $K_2$ and thereby closing switch B to energize the headlight circuit, and opening switch C to break the relay $K_2$ holding circuit, and the headlights will be fully responsive to manual operation of headlight switch 53.

What is claimed is:

1. An automatic control system for the headlights of an automobile having a door, an electrical power source and an ignition switch, comprising a first switch closable responsive to opening of said ignition switch, an electrical circuit including said first switch, a relay and a normally open switch closed responsive to opening of said automobile door, said relay including a second switch openable responsive to energization of said relay, a headlight circuit including said second switch, and means for keeping said relay energized while said ignition switch is open and after closing of said door whereby to maintain said second switch open and said headlight circuit open when said ignition switch is off and the driver is out of the automobile.

2. An automatic control system according to claim 1 including selectively operable means for deenergizing said relay and thereby closing said second switch to make said headlights operable while said ignition switch is off.

3. An automatic control system according to claim 1 in which said means for keeping said relay energized after said door is closed comprises a third normally open switch in said relay closed when said relay is energized, and a shunt from said relay by-passing said door switch and including said third switch.

4. An automatic control system according to claim 3, including another relay in series with said power source and said ignition switch, said other relay containing said first switch and arranged to open the same when energized by closure of said ignition switch.

5. An automatic control system according to claim 4 wherein said shunt includes a normally closed reset switch selectively manually operable to break said by-pass circuit and deenergize said first-named relay and thereby close said second switch controlling said headlight circuit.

6. An automatic control system according to claim 1 having a first circuit including said power source, said ignition switch and another relay, said first switch being in said other relay and closed responsive to deenergization of said other relay when said ignition switch is open.

7. An automatic control system according to claim 3, wherein a normally closed reset switch is located in said shunt, said reset switch being selectively operable to deenergize said relay and thereby open said second switch to break the headlight circuit.

8. An automatic control system according to claim 1, wherein said headlight circuit includes a normally open selectively closable headlight switch.

9. An automatic control system according to claim 8, wherein said headlight circuit also encloses a selectively operable dimmer switch.

References Cited
UNITED STATES PATENTS

| | | | |
|---|---|---|---|
| 2,806,980 | 9/1957 | Shapiro | 315—83 |
| 3,058,030 | 10/1962 | Simpkins | 315—83X |
| 3,125,702 | 3/1964 | Herridge et al. | 315—83X |
| 3,423,633 | 1/1969 | Kawai et al. | 315—83 |
| 3,433,969 | 3/1969 | Krenke | 315—83X |
| 3,476,975 | 11/1969 | Brock | 315—83 |

ROY LAKE, Primary Examiner

C. R. CAMPBELL, Assistant Examiner

U.S. Cl. X.R.

315—77, 83